June 23, 1964  L. G. LAKIN  3,137,919
PRODUCTION OF COOPERATIVE ROLLS
Filed Oct. 4, 1961
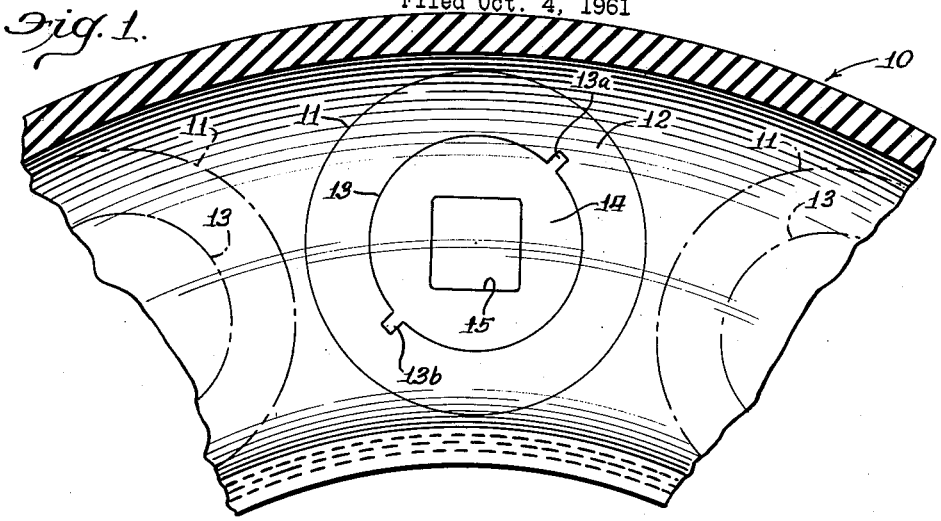
Fig. 1.
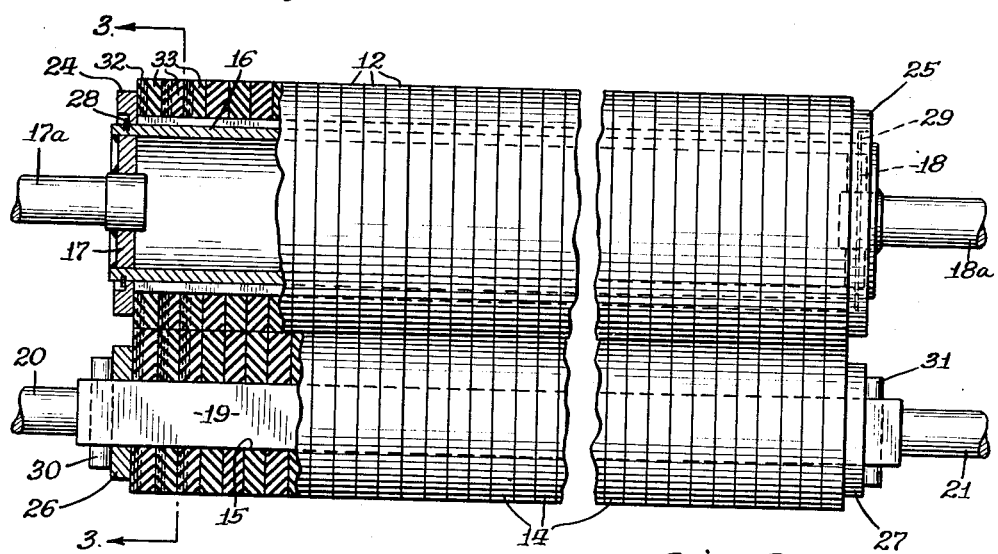
Fig. 2.
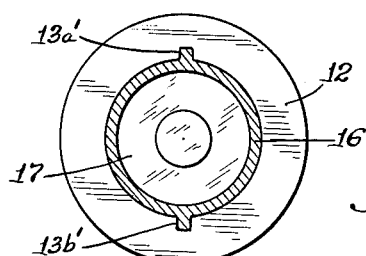
Fig. 3.
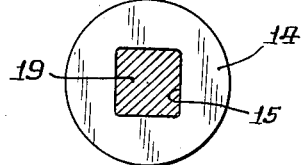
INVENTOR.
Lewis G. Lakin
BY Snow and Benno
Attys.

United States Patent Office 3,137,919
Patented June 23, 1964

3,137,919
PRODUCTION OF COOPERATIVE ROLLS
Lewis G. Lakin, Skokie, Ill., assignor to A. Lakin & Sons, Inc., a corporation of Illinois
Filed Oct. 4, 1961, Ser. No. 142,794
2 Claims. (Cl. 29—148.4)

This invention relates to new and improved tire carcass discs for rolls.

Rolls used in agricultural machinery have been made of laminated discs cut from fiber-impregnated rubber such as tire casings for a number of years. The Siemen Patents 2,416,123 and 2,416,124 depict what the industry now commonly refers to as tire carcass rolls. Rolls so made are desirable for a number of reasons. They are economical to manufacture; they are long-wearing because of the fibers embedded therein; they are aggresive because of their combined rubber and fiber content; and because of their rubber content are moderately compressible. More recently laminated disc tire carcass rolls have been used in crushing hay. The tire carcass roll is used in conjunction with a steel surface roll or another rubber or tire carcass roll. It is with the cooperating tire carcass rolls that the present invention is primarily concerned.

Another important object of this invention is to supply cooperative rolls of laminated tire carcass discs in which one of the rolls is of larger diameter than the other.

Still another important object of this invention is to provide cooperative rolls made of laminated tire carcass discs and the discs of the smaller roll cut from the center of the discs of the larger roll.

Another and still further important object of this invention is to provide an arrangement of the discs in tire carcass hay conditioning rolls wherein there is obtained uniform or even splitting or cracking of the plant stems with the least possible leaf loss giving the resultant hay a high food value.

Other and further important objects and advantages will become apparent from the disclosures in the following specification and accompanying drawing.

In the drawing:

FIGURE 1 is a sectional view of a portion of vehicle tire casing showing die cuts made therein to form the discs of this invention.

FIGURE 2 is an elevational view partially in section of the cooperative tire carcass rolls made with the discs of this invention.

FIGURE 3 is a sectional view taken on the line 3—3 of FIGURE 2.

As shown in the drawing:

The reference numeral 10 indicates generally a portion of tire casing. The casing of each make of vehicle tire is slightly different in that there are various numbers of plies in the tires and various fibers in the tires such as nylon, rayon, cotton or some other synthetic or natural fiber. All of these factors change the cross sectional characteristics of the tire carcass and in any roll desired to be used in a particular application, it is preferable that the roll be made from the same or similar types of tire carcass so that it is uniform throughout its length. More recently the use of cooperating tire carcass rolls in conditioning hay has necessitated the maintenance of greater uniformity in a pair of rolls. As stated in the objects above it is one of the purposes of the present invention to provide mating discs of cooperative rolls of identical tire carcass material. This is accomplished by cutting both discs from the same piece of tire carcass.

The die cut shown at 11 on the tire casing 10 forms a large disc 12 which is used in the large diameter roller of a pair of cooperative hay crushing rolls. A die cut 13 made concentrically within the center of the large disc 12 forms a smaller disc 14. Thus the small disc 14 is taken or cut from the center of the large disc 12 so that the resultant discs are made of identical tire carcass materials. As previously stated it is preferable to make these large and small discs in opposing relationship in the cooperative rolls in a manner that will be hereinafter described. A further die cut 15 forms a square center within the middle of the small disc 14. It is preferable that all of the die cuts be made simultaneously or at least with a progressive die so there is a minimum of material handling.

The die cut 13 includes generally diametrically opposed ears 13a and 13b. The ears form notches in the large discs 12 by which the discs are effectively held against separate rotation on a shaft structure. The projecting ears on the smaller disc 14 are dressed or cut off to provide a smooth exterior to the small diameter roll formed of a plurality of the discs 14.

As shown in FIGURE 2 a plurality of large discs 12 are placed in side-by-side relationship onto a tubular shaft 16. The tubular shaft 16 is of substantially the same diameter as the internal diameter of the opening in the large discs 12. Spaced apart end gudgeons 17 and 18 are welded or otherwise fastened internally of the tubular shaft 16. A relatively small diameter stub shaft 17a is concentrically provided on the gudgeon 17 and similarly a small diameter stub shaft 18a is provided on the other end of the roll on the gudgeon 18. The tubular shaft 16 and its internally welded end gudgeons 17 and 18 thus make for a unitary shaft structure on which the large discs 12 are mounted. The tube 16 is preferably provided with diametrically disposed radial ribs 13a' and 13b' which act as keys to engage the notches 13a and 13b and thus hold the discs against relative rotation on the shaft 16.

A square shaft 19 constitutes the supporting structure for the small discs 14 with their central square centers 15. Here again a plurality of the small discs are placed on the square shaft 19 and assembled in side-by-side relationship forming a roll for cooperation with the assembled discs on the large diameter roll. The square shaft 19 is provided with rounded ends 20 and 21 for convenient journaling.

For convenience the roll made up of the large diameter discs 12 is designated by the numeral 22 and shall be called the large diameter roll. Similarly, the roll made up of the small diameter discs 14 shall be termed the small diameter roll and is designated by the numeral 23.

The large diameter roll 22 is provided with end-holding caps 24 and 25 which are mounted over the tubular shaft 16 and hold the plurality of laminated tire carcass discs 12 in tight relationship on the supporting sleeve 16. Similarly the small diameter roll 23 is provided with end caps 26 and 27 which are mounted over the shaft 19 to hold the small diameter tire carcass discs 14 in compressed relationship. The end caps 24 and 25 are held in position by snap rings 28 and 29, respectively, and similarly the end caps 26, 27 are held in position on the small diameter roll shafts by pins 30 and 31. The snap rings and the pins thus hold the discs under compression so that the resultant roll is relatively solid presenting a substantially uniform surface throughout its length.

Attention is invited to my copending applications Serial No. 41,997 filed July 11, 1960, entitled Roller, now abandoned and Serial No. 140,121 filed September 22, 1961 now Patent No. 3,112,024, issued November 26, 1963, entitled Roll Construction, which show the cutting of tire carcass discs from tire casings and the disposition of the fibers and rubber material in each of the discs. The present drawing diagrammatically shows the content of the discs by the designation of the fiber or fabric material backing therein by the numeral 32 and the predominantly rubber covering facing by the numeral 33 and their face-to-back disposition when laminated in roll form. As stated above it is necessary for the proper function of cooperative hay conditioning rolls to have the rolls mate with similar or preferably identical materials in the cooperative roll. Therefore, the discs cut one from within the other make an ideal arrangement so that the discs 12 in the large diameter roll 22 may mate with the same material in the smaller roll by engaging the identical discs 14 cut from within the large diameter discs 12. It is, of course, preferable that the entire roll be cut from similar tire carcass materials but in the event they are not, then the next best thing is to have each portion of the roll mating with and cooperating with the identical material in that portion of the opposite roll. This arrangement has been found to cause the most uniform splitting or cracking of plant stems with the least possible leaf loss, thereby retaining higher food value in the conditioned hay. Here again as in the previous agricultural rolls made of tire carcass material, the imbedded fabric or fiber cords act to reinforce and give the discs long-wearing characteristics and aggressive action in the engagement of materials such as hay which is passed therebetween. Of course the rubber material of the tire carcass gives it the compressible characteristic that is so necessary to effective hay crushing.

Thus there is provided herein not only an article of cooperative rolls made from identical tire carcass materials in opposing sections thereof but also a process of cutting one disc from within the center of a larger disc.

The die or dies used to cut the tire carcass material on the die cut lines 11 and 13 as shown in FIGURE 1 may be a single multiple piece die or may be several dies in order to cut out the large discs 12, the smaller inside discs 15 and the central square opening 15. However, it is desirable that the discs, both large and small, be cut from a single section of tire casing and that the small discs be cut concentrically from within the large discs 12. In this manner the materials of both tire carcass discs are identical and their use in cooperative hay conditioning rolls opposite one another is such as to produce an effective hay crushing most desirable in simultaneously treating and curing hay to permit safe storing of the hay for the longest period of time.

I am aware that numerous details of construction may be varied throughout a wide range without departing from the principles disclosed herein and I therefore do not propose limiting the patent granted hereon otherwise than as necessitated by the appended claims.

What is claimed is:

1. A process for cutting tire carcass discs for use in making cooperative rolls comprising the steps of cutting relatively large discs from tire carcass, cutting relatively small discs from within the center of the large discs with the external periphery thereof having a generally radially extending projection and with a cutout central opening of generally polygonal cross section, assembling a plurality of said large discs on a shaft with an external radial key under endwise compression and with the radial key engaging the radial notch formed by the radially extending projection, assembling a plurality of said small discs on a shaft having a polygonal cross section comparable to the polygonal cross sectional opening of the small discs under endwise compression, cutting off the radially extending projections of the small discs, and mating the discs of the large roll with the discs of the small roll which were cut from the center of the large discs, and placing said formed rolls in cooperative engagement with each other.

2. The method of making a pair of cooperative rolls which comprises cutting tire carcasses in areas having a fiber reinforced rubber thickness backing and a fiber-free rubber thickness facing to define relatively large annular discs and relatively small discs of substantially the same thickness having an outer diameter of that of the inner diameter of the former, laminating the relatively large discs on a shaft in nonrotatable relationship thereon with each disc in face-to-back relationship to the other, laminating the relatively smaller discs on a separate shaft in non-rotatable relationship thereon and in like face-to-back relationship to each other, and disposing the resulting rolls in peripheral contiguous relationship.

References Cited in the file of this patent

UNITED STATES PATENTS

| | | |
|---|---|---|
| 1,236,338 | Miller | Aug. 7, 1917 |
| 1,830,819 | Wishmeier | Nov. 10, 1931 |
| 2,203,125 | Beauchamp | June 4, 1940 |
| 2,308,277 | Gillen | Jan. 12, 1943 |
| 2,712,282 | Koch | July 5, 1955 |
| 2,753,788 | Getz | July 10, 1956 |
| 2,913,811 | Benson | Nov. 24, 1959 |
| 2,958,991 | Heth | Nov. 8, 1960 |
| 3,008,220 | Sammarco | Nov. 14, 1961 |